(12) United States Patent
Alexander et al.

(10) Patent No.: US 9,003,788 B2
(45) Date of Patent: Apr. 14, 2015

(54) VEHICLE ENERGY HARVESTING DEVICE HAVING A CONTINUOUS LOOP OF SHAPE MEMORY ALLOY

(75) Inventors: Paul W. Alexander, Ypsilanti, MI (US); Alan L. Browne, Grosse Pointe, MI (US); Nancy L. Johnson, Northville, MI (US); Patrick B. Usoro, Troy, MI (US); Nilesh D. Mankame, Ann Arbor, MI (US); Geoffrey P. McKnight, Los Angeles, CA (US); Peter Maxwell Sarosi, Royal Oak, MI (US); Christopher P. Henry, Thousand Oaks, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 1104 days.

(21) Appl. No.: 12/947,866

(22) Filed: Nov. 17, 2010

(65) Prior Publication Data

US 2011/0124451 A1    May 26, 2011

Related U.S. Application Data

(60) Provisional application No. 61/263,162, filed on Nov. 20, 2009.

(51) Int. Cl.
 *F01B 29/10*  (2006.01)
 *F02G 1/04*  (2006.01)
 *F02G 5/04*  (2006.01)

(52) U.S. Cl.
 CPC . *F02G 5/04* (2013.01); *Y02T 10/166* (2013.01)

(58) Field of Classification Search
 USPC ............ 60/527–529; 474/139, 134, 136, 137; 310/306–307
 See application file for complete search history.

(56) References Cited

U.S. PATENT DOCUMENTS

| 298,291 | A | * | 5/1884 | Cromie | ......................... 474/136 |
| 3,316,415 | A | * | 4/1967 | Taylor | ........................... 290/1 R |

(Continued)

FOREIGN PATENT DOCUMENTS

| DE | 10108468 A1 | 9/2002 |
| JP | 60022079 A | 2/1985 |

(Continued)

OTHER PUBLICATIONS

Kaufman, George B. Memory Metal, Oct. 1993. American Chemical Society. ChemMatters, p. 4.*

(Continued)

*Primary Examiner* — Thomas Denion
*Assistant Examiner* — Mickey France
(74) *Attorney, Agent, or Firm* — Quinn Law Group, PLLC

(57) ABSTRACT

An energy harvesting system comprises a first region having a first temperature and a second region. A conduit is located at least partially within the first region. A heat engine configured for converting thermal energy to mechanical energy includes a shape memory alloy forming at least one generally continuous loop. The shape memory alloy is disposed in heat exchange contact with the first region and the second region. The shape memory alloy is driven to rotate around at least a portion of the conduit by the response of the shape memory alloy to the temperature difference between the first region and the second region. At least one pulley is driven by the rotation of the shape memory alloy, and the at least one pulley is operatively connected to a component to thereby drive the component.

14 Claims, 5 Drawing Sheets

(56) References Cited

U.S. PATENT DOCUMENTS

| | | | | |
|---|---|---|---|---|
| 3,949,573 | A | * | 4/1976 | Jacobsson .................. 66/132 T |
| 4,010,612 | A | * | 3/1977 | Sandoval ...................... 60/527 |
| 4,030,298 | A | * | 6/1977 | Sandoval ...................... 60/527 |
| 4,117,680 | A | * | 10/1978 | Smith ............................ 60/527 |
| 4,150,544 | A | | 4/1979 | Pachter |
| 4,275,561 | A | * | 6/1981 | Wang ............................ 60/527 |
| 4,302,938 | A | * | 12/1981 | Li .................................. 60/527 |
| 4,472,939 | A | * | 9/1984 | Wang ............................ 60/527 |
| 4,761,955 | A | * | 8/1988 | Bloch ............................ 60/528 |
| 5,442,914 | A | | 8/1995 | Otsuka |
| 6,086,494 | A | * | 7/2000 | Crosta ............................ 474/88 |
| 6,497,634 | B1 | * | 12/2002 | Bode et al. .................. 475/211 |
| 7,350,762 | B2 | * | 4/2008 | MacGregor et al. ........... 251/11 |
| 7,444,350 | B1 | | 10/2008 | MacKinnon et al. |
| 8,707,693 | B2 | * | 4/2014 | Alexander et al. ............ 60/527 |
| 2005/0241315 | A1 | * | 11/2005 | Schlote .......................... 60/772 |
| 2006/0218924 | A1 | * | 10/2006 | Mitani ........................... 60/659 |
| 2008/0110683 | A1 | * | 5/2008 | Serkh ......................... 180/65.2 |
| 2008/0264058 | A1 | * | 10/2008 | Broer et al. .................... 60/527 |
| 2013/0090200 | A1 | * | 4/2013 | Richardson .................. 474/139 |

FOREIGN PATENT DOCUMENTS

| | | | |
|---|---|---|---|
| JP | 5118272 A | | 5/1993 |
| JP | 2003232276 A | | 8/2003 |
| JP | 2005002978 A | | 1/2005 |
| JP | 2005076558 A | * | 3/2005 ............... F03G 7/06 |

OTHER PUBLICATIONS

Webster's II New College Dictionary, 1999. Definitions of "lobe" and "proximate."*

* cited by examiner

VEHICLE ENERGY HARVESTING DEVICE HAVING A CONTINUOUS LOOP OF SHAPE MEMORY ALLOY

CROSS REFERENCE TO RELATED APPLICATIONS

This application claims the benefit of U.S. Provisional Application Ser. No. 61/263,162 filed Nov. 20, 2009, the entire contents of which are hereby incorporated by reference.

TECHNICAL FIELD

The present invention generally relates to a vehicle, and more specifically, to an energy source for the vehicle and vehicle accessories.

BACKGROUND

Vehicles are traditionally powered by engines that drive the vehicle and batteries that provide power for starting the engine and for vehicle accessories. Advancements in technology and a desire for driver conveniences have increased the number of vehicle accessories, as well as increased the load, i.e., power demand, on the engine and/or the battery required to power the vehicle accessories. In addition, the vehicle power sources and components produce a large quantity of waste heat, i.e., waste thermal energy that is typically dissipated into the atmosphere and lost.

Accordingly, arrangements for extending driving range and increasing the fuel efficiency of the vehicle are desirable. Therefore, systems that increase the fuel efficiency of the vehicle and reduce the power load on the vehicle's traditional power sources, i.e., the engine and/or the battery, are desirable, and significant vehicle fuel economy gains may be realized if the vehicle's waste heat is converted into usable mechanical and/or electrical energy.

SUMMARY

An energy harvesting system comprises a first region having a first temperature and a second region having a second temperature that is different from the first temperature. A conduit is located at least partially within the first region. A heat engine, configured for converting thermal energy to mechanical energy, includes a shape memory alloy forming at least one generally continuous loop. The shape memory alloy is disposed in heat exchange contact with the first region and the second region. The shape memory alloy is driven to rotate around at least a portion of the conduit in response to the temperature difference between the first region and the second region. At least one pulley is driven by the rotation of the shape memory alloy. The pulley is operatively connected to a component to thereby drive the component.

A method of harvesting energy comprises exposing localized regions of a shape memory alloy to heat exchange contact with a first region having a first temperature and a second region having a second temperature that is different from the first temperature. The shape memory alloys has a crystallographic phase changeable between austenite and martensite in response to the temperature difference between the first region and the second region and the localized regions of the shape memory alloy expand and contract in response to the temperature difference between the first region and the second region. At least one continuous loop of the shape memory alloy is rotated at least partially around a conduit located within the first region in response to expanding and contracting the localized regions of the shape memory alloy. At least one pulley is driven to rotate with the rotation of the shape memory alloy, and thereby drives a component.

A vehicle comprises a conduit for the vehicle, a first region that has a first temperature, and a second region that has a second temperature that is different from the first temperature. The first region surrounds the conduit, and the second region at least partially surrounds the first region. A heat engine for the vehicle configured for converting thermal energy to mechanical energy includes a support concentrically located about the conduit. A plurality of inner pulleys and a plurality of outer pulleys are rotatably mounted to the support in an alternating relationship with one another. At least one continuous loop of a shape memory alloy is alternately threaded about an interior of the plurality of inner pulleys and an exterior of the outer pulleys surrounding the conduit. The shape memory alloy is disposed in heat exchange contact with the first region and the second region such that at least one of the plurality of inner pulleys and the plurality of outer pulleys is driven to rotate by the shape memory alloy in response to the temperature difference between the first region and the second region. A component of the vehicle is driven by the rotation of the at least one of the plurality of inner pulleys and the plurality of outer pulleys.

The above features and advantages, and other features and advantages of the present invention will be readily apparent from the following detailed description of the preferred embodiments and best modes for carrying out the present invention when taken in connection with the accompanying drawings and appended claims.

DETAILED DESCRIPTION

Figure 1:
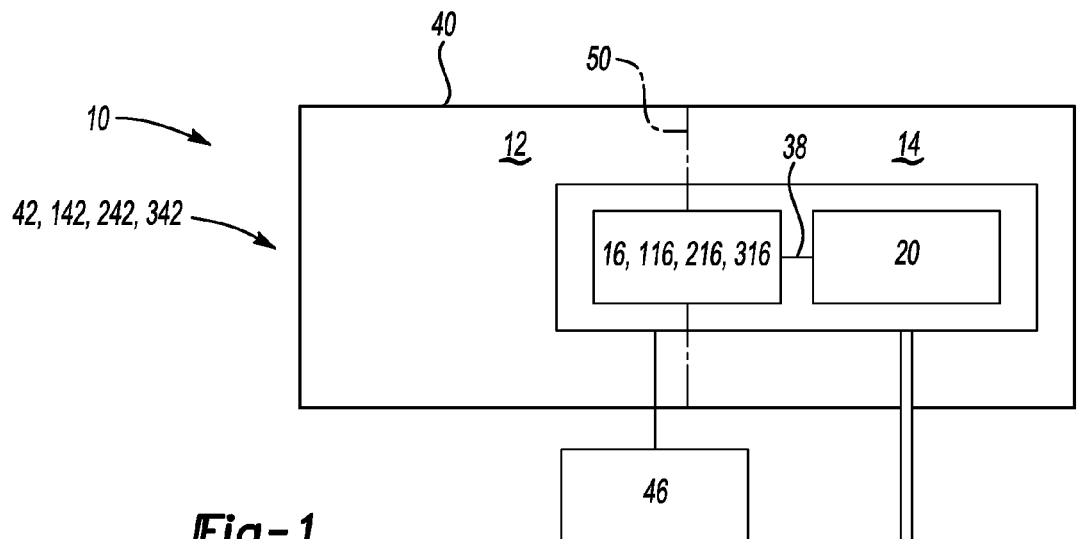
FIG. 1 is a schematic diagram of a vehicle having an energy harvesting system.

Referring to the Figures, wherein like reference numerals refer to like elements, a vehicle is shown generally at 10 in FIG. 1. The vehicle 10 includes an energy harvesting system 42, 142, 242, 342. The energy harvesting system 42, 142, 242, 342 utilizes the temperature difference between a first region 12 and a second region 14 to generate mechanical or electrical energy, and therefore may be useful for automotive applications. However, it is to be appreciated that the energy harvesting system 42, 142, 242, 342 may also be useful for non-automotive applications. The energy harvesting system 42, 142, 242, 342 includes a heat engine 16, 116, 216, 316. The heat engine 16, 116, 216, 316 is configured for converting thermal energy, e.g., heat, to mechanical or heat to mechanical and then to electrical energy, as set forth in more detail below.

The vehicle 10 defines a compartment 40 which may house power and drive sources for the vehicle 10, such as an engine and transmission (not shown). The compartment 40 may or may not be enclosed from the surrounding environment, and may include regions and components exterior to the vehicle 10 such as an exhaust pipe and catalytic converter, shock absorbers, brakes, and any other region where energy is dissipated as heat proximate to or in the vehicle 10 such as in a passenger compartment, engine compartment, or a battery compartment (such as in an electric vehicle).

The energy harvesting system 42, 142, 242, 342 is at least partially located within the compartment 40. The power and drive sources (not shown) for the vehicle 10 typically generate heat. Therefore, the compartment 40 includes the first region 12 and the second region 14 having a temperature difference therebetween. The first region 12 and the second region 14 may be spaced apart from one another to provide a sufficient heat exchange barrier 50 between the first region 12 and the second region 14.

Fluid within the energy harvesting system 42, 142, 242, 342 may fill the first region 12 and the second region 14 and may be selected from a group of gases, liquids, and combinations thereof. The fluid within the first region 12 may be a different fluid than the fluid within the second region. In the embodiment discussed above where the compartment 40 is an engine compartment, fluid within the first region 12 and the second region 14 is air within the compartment 40. Objects located within the first region 12 and the second region 14 may generate or dissipate heat to the fluid surrounding the object and forming the first region 12 and the second region 14. Alternatively, the first region 12 and/or the second region 14 may be the object that is the heat source or heat sink and the energy harvesting system 42, 142, 242, 342 may have physical contact with the first region 12 and the second region 14 to take advantage of the temperature difference therebetween.

Several examples within a vehicle 10 where the energy harvesting system 42, 142, 242, 342 may take advantage of temperature differentials are proximate to or incorporated with an exhaust system, including proximity to a catalytic converter, next to a battery for the vehicle or within a battery compartment for electric vehicles, proximate to a transmission, brakes, or components of the vehicle suspension in particular a shock absorber, or proximate to or incorporated within a heat exchanger, such as a radiator. The above examples list areas of the vehicle 10 which may act as one of the first region 12 or the second region 14. The energy harvesting system 42, 142, 242, 342 may be positioned such that the other of the first region 12 or the second region 14 is separated by a sufficient heat exchange barrier 50 to provide the required temperature differential. The above list only provides examples of where the energy harvesting system 42, 142, 242, 342 may be located and is not intended to be all inclusive of arrangements for the energy harvesting system 42, 142, 242, 342. One skilled in the art would be able to determine areas having an associated temperature differential and an appropriate position for the energy harvesting system 42, 142, 242, 342 to take advantage of the temperature differences.

The energy harvesting system 42, 142, 242, 342 also includes a driven component 20. The component 20 may be a simple mechanical device, selected from a group including a fan, a belt, a clutch drive, a blower, a pump, a compressor and combinations thereof. The component 20 is driven by the heat engine 16, 116, 216, 316. The component 20 may be part of an existing system within the vehicle 10 such as a heating or cooling system. The mechanical energy may drive the component 20 or may assist other systems of the vehicle 10 in driving the component 20. Driving the component 20 with power provided by the heat engine 16, 116, 216, 316 may also allow an associated existing system within the vehicle 10 to be decreased in size/capacity providing weight savings in addition to the energy savings.

Alternately, the component 20 may be a generator or part of a generator. The component/generator 20 is configured for converting mechanical energy from the heat engine 16, 116, 216, 316 to electricity (represented generally by symbol EE in FIG. 1). The component/generator 20 may be any suitable device for converting mechanical energy to electricity EE. For example, the component/generator 20 may be an electrical generator that converts mechanical energy to electricity EE using electromagnetic induction, and may include a rotor (not shown) that rotates with respect to a stator (not shown). The electrical energy EE from the component/generator 20 may than be used to assist in powering the main or accessory drive systems within the vehicle 10.

As explained above, the energy harvesting system 42, 142, 242, 342 is configured for generating mechanical or electric energy and includes structure defining the first region 12 having a first temperature and structure defining the second region 14 having a second temperature that is different from the first temperature.

In one variation, the energy harvesting system 42, 142, 242, 342 also includes an electronic control unit 46. The electronic control unit 46 is in operable communication with the vehicle 10. The electronic control unit 46 may be, for example, a computer that electronically communicates with one or more controls and/or sensors of the energy harvesting system 42, 142, 242, 342. For example, the electronic control unit 46 may communicate with and/or control one or more of a temperature sensor within the first region 12, a temperature sensor within the second region 14, a speed regulator of the component 20, fluid flow sensors, and meters configured for monitoring electricity generation. The electronic control unit 46 may control the harvesting of energy under predetermined conditions of the vehicle 10. For example, after the vehicle 10 has operated for a sufficient period of time to ensure that a temperature differential between the first region 12 and the second region 14 is at an optimal difference the electronic control unit 46 may start the energy harvesting system 42, 142, 242, 342. An electronic control unit 46 may also provide the option to manually override the heat engine 16, 116, 216, 316 to allow the energy harvesting system 42, 142, 242, 342 to be turned off. A clutch (not shown) controlled by the electronic control unit 46 may be used to disengage the heat engine 16, 116, 216, 316 from the component 20.

As also shown in FIG. 1, the energy harvesting system 42, 142, 242, 342 includes a transfer medium 48 configured for conveying electricity EE from the energy harvesting system 42, 142, 242, 342. In particular, the transfer medium 48 may convey electricity EE from the component/generator 20. The transfer medium 48 may be, for example, a power line or an electrically-conductive cable. The transfer medium 48 may convey electricity EE from the component/generator 20 to a storage device 54, e.g., a battery for the vehicle. The storage device 54 may also be located proximate to but separate from the vehicle 10. Such a storage device 54 may allow the energy harvesting system 42, 142, 242, 342 to be utilized with a parked vehicle such as 10. For example, the energy harvesting system 42, 142, 242, 342 may take advantage of a temperature differential created by sun load on a hood for the compartment 40 and store the electrical energy EE generated in the storage device 54.

Whether the energy from the energy harvesting system 42, 142, 242, 342 is used to drive a component 20 directly or stored for later usage the energy harvesting system 42, 142, 242, 342 provides additional energy to the vehicle 10 and reduces the load on the main energy sources for driving the vehicle 10. Thus, the energy harvesting system 42, 142, 242, 342 increases the fuel economy and range for the vehicle 10. As described above, the energy harvesting system 42, 142, 242, 342 may operate autonomously requiring no input from the vehicle 10.

It is to be appreciated that for any of the aforementioned examples, the vehicle 10 and/or the energy harvesting system 42, 142, 242, 342 may include a plurality of heat engines 16, 116, 216, 316 and/or a plurality of components 20. That is, one vehicle 10 may include more than one heat engine 16, 116, 216, 316 and/or component 20. For example, one heat engine 16, 116, 216, 316 may drive more than one component 20. Likewise, vehicle 10 may include more than one energy harvesting system 42, 142, 242, 342, each including at least one heat engine 16, 116, 216, 316 and component 20. Multiple heat engines 16, 116, 216, 316 may take advantage of multiple regions of temperature differentials throughout the vehicle 10.

Figure 2:
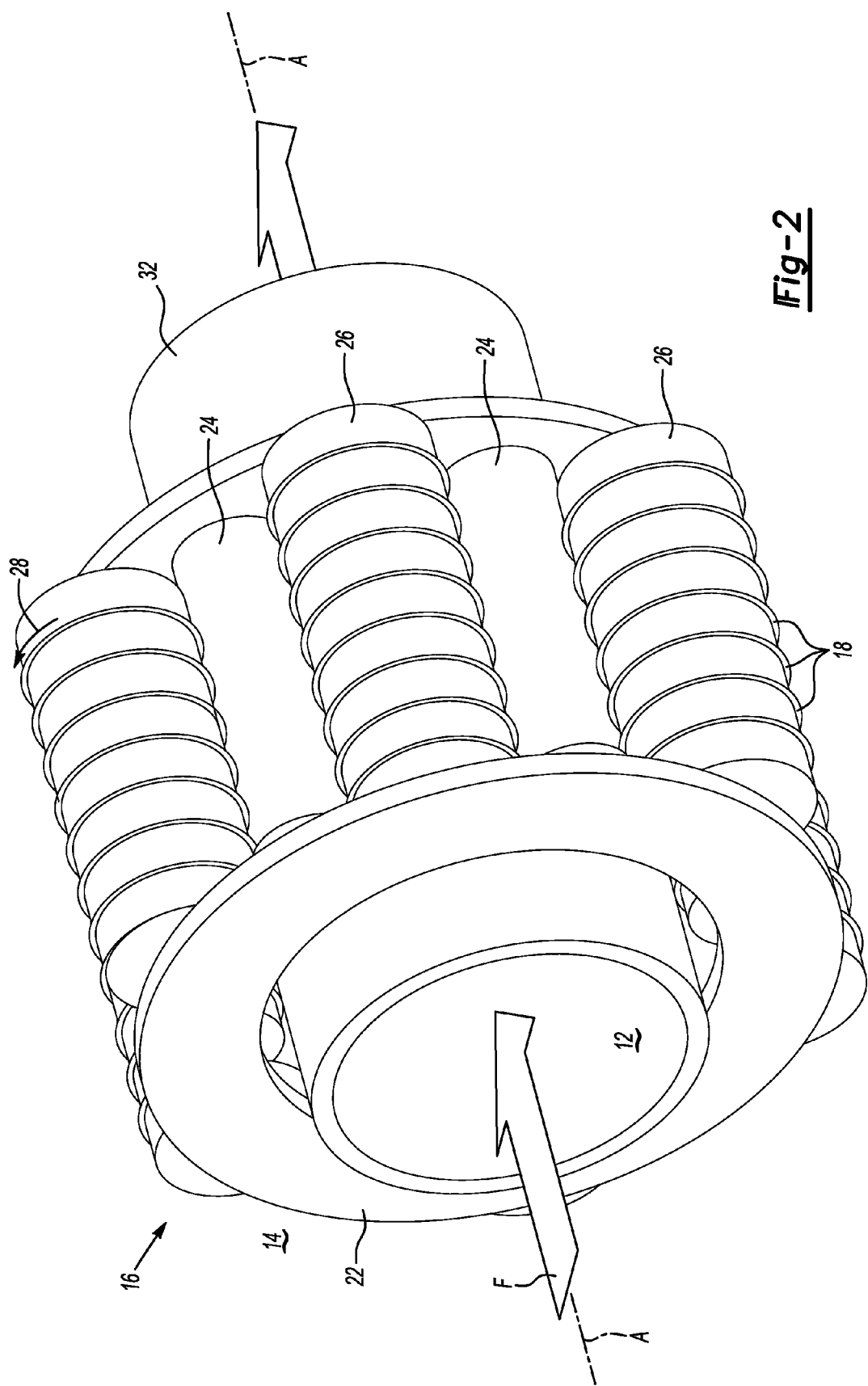
FIG. 2 is a schematic perspective view of a first embodiment of the energy harvesting system of FIG. 1.

Referring now to FIGS. 1 and 2, the heat engine 16 is configured for converting thermal energy, e.g., heat, to mechanical energy or heat to mechanical energy and then to electrical energy, as set forth in more detail below. The heat engine 16 includes a shape memory alloy 18 (FIG. 2) having a crystallographic phase changeable between austenite and martensite at a specific temperature to which the shape memory alloy 18 is exposed in one of the first region 12 and the second region 14. In response to the temperature difference of the first region 12 and the second region 14 (FIG. 1) the shape memory alloy 18 undergoes the crystallographic phase change while passing between the first region 12 and the second region 14. The below description is in reference to FIG. 2. However, the shape memory alloy 18 of all the embodiments operates in a similar manner.

As used herein, the terminology "shape memory alloy" refers to alloys which exhibit a shape-memory effect. That is, the shape memory alloy 18 may undergo a solid state phase change via molecular rearrangement to shift between a martensite phase, i.e., "martensite", and an austenite phase, i.e., "austenite". Stated differently, the shape memory alloy 18 may undergo a displacive transformation rather than a diffusional transformation to shift between martensite and austenite. In general, the martensite phase refers to the comparatively lower-temperature phase and is often more deformable than the comparatively higher-temperature austenite phase. The temperature at which the shape memory alloy 18 begins to change from the austenite phase to the martensite phase is known as the martensite start temperature, $M_s$. The temperature at which the shape memory alloy 18 completes the change from the austenite phase to the martensite phase is known as the martensite finish temperature, $M_f$. Similarly, as the shape memory alloy 18 is heated, the temperature at which the shape memory alloy 18 begins to change from the martensite phase to the austenite phase is known as the austenite start temperature, $A_s$. And, the temperature at which the shape memory alloy 18 completes the change from the martensite phase to the austenite phase is known as the austenite finish temperature, $A_f$.

Therefore, the shape memory alloy 18 may be characterized by a cold state, i.e., when a temperature of the shape memory alloy 18 is below the martensite finish temperature $M_f$ of the shape memory alloy 18. Likewise, the shape memory alloy 18 may also be characterized by a hot state, i.e., when the temperature of the shape memory alloy 18 is above the austenite finish temperature $A_f$ of the shape memory alloy 18.

In operation, i.e., when exposed to the temperature difference of first region 12 and the second region 14, the shape memory alloy 18, if pre-strained or subjected to tensile stress, can change dimension upon changing crystallographic phase to thereby convert thermal energy to mechanical energy. That is, the shape memory alloy 18 may change crystallographic phase from martensite to austenite and thereby dimensionally contract if pseudoplastically pre-strained so as to convert thermal energy to mechanical energy. Conversely, the shape memory alloy 18 may change crystallographic phase from austenite to martensite and if under stress thereby dimensionally expand so as to convert thermal energy to mechanical energy.

Pseudoplastically pre-strained refers to stretching the shape memory alloy 18 while in the martensite phase so that the strain exhibited by the shape memory alloy 18 under that loading condition is not fully recovered when unloaded, where purely elastic strain would be fully recovered. In the case of shape memory alloy 18, it is possible to load the material such that the elastic strain limit is surpassed and deformation takes place in the martensitic crystal structure of the material prior to exceeding the true plastic strain limit of the material. Strain of this type, between those two limits, is pseudoplastic strain, called such because upon unloading it appears to have plastically deformed, but when heated to the point that the shape memory alloy 18 transforms to its austenite phase, that strain can be recovered, returning the shape memory alloy 18 to the original length observed prior to any load applied. Shape memory alloy 18 is typically stretched before installation into the heat engine 18, such that the nominal length of the shape memory alloy 18 includes that recoverable pseudoplastic strain, which provides the motion used for actuating/driving the heat engine 16. Without pre-stretching the shape memory alloy 18, little deformation would be seen during phase transformation.

The shape memory alloy 18 may have any suitable composition. In particular, the shape memory alloy 18 may include an element selected from the group including cobalt, nickel, titanium, indium, manganese, iron, palladium, zinc, copper, silver, gold, cadmium, tin, silicon, platinum, gallium, and combinations thereof. For example, suitable shape memory alloys 18 may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations thereof. The shape memory alloy 18 can be binary, ternary, or any higher order so long as the shape memory alloy 18 exhibits a shape memory effect, e.g., a change in shape orientation, damping capacity, and the like. A skilled artisan may select the shape memory alloy 18 according to desired operating temperatures within the compartment 40 (FIG. 1), as set forth in more detail below. In one specific example, the shape memory alloy 18 may include nickel and titanium.

Further, the shape memory alloy 18 may have any suitable form, i.e., shape. For example, the shape memory alloy 18 may have a form selected from the group including bias members (such as springs), tapes, wires, bands, continuous loops, and combinations thereof Referring to FIG. 2, in one variation, the shape memory alloy 18 may be formed as a continuous loop spring.

The heat engine 16, and more specifically, the shape memory alloy 18 (FIG. 2) of the heat engine 16, is disposed in thermal contact or heat exchange relation with each of the first region 12 and the second region 14. Therefore, the shape memory alloy 18 may change crystallographic phase between austenite and martensite upon thermal contact or heat exchange relation with one of the first region 12 and the second region 14. For example, upon contact with the first region 12, the shape memory alloy 18 may change from martensite to austenite. Likewise, upon thermal contact with the second region 14, the shape memory alloy 18 may change from austenite to martensite.

Further, the shape memory alloy 18 may change both modulus and dimension upon changing crystallographic phase to thereby convert thermal energy to mechanical energy. More specifically, the shape memory alloy 18, if pseudoplastically pre-strained may dimensionally contract upon changing crystallographic phase from martensite to austenite and may dimensionally expand, if under tensile stress, upon changing crystallographic phase from austenite to martensite to thereby convert thermal energy to mechanical energy. Therefore, for any condition wherein the temperature difference exists between the first temperature of the first region 12 and the second temperature of the second region 14, i.e., wherein the first region 12 and the second region 14 are not in thermal equilibrium, the shape memory alloy 18 may dimensionally expand and contract upon changing crystallographic phase between martensite and austenite. And, the change in crystallographic phase of the shape memory alloy 18 may cause the shape memory alloy to rotate the pulleys 24, 26 (shown in FIG. 2) and, thus, drive the component 20.

Figure 3:
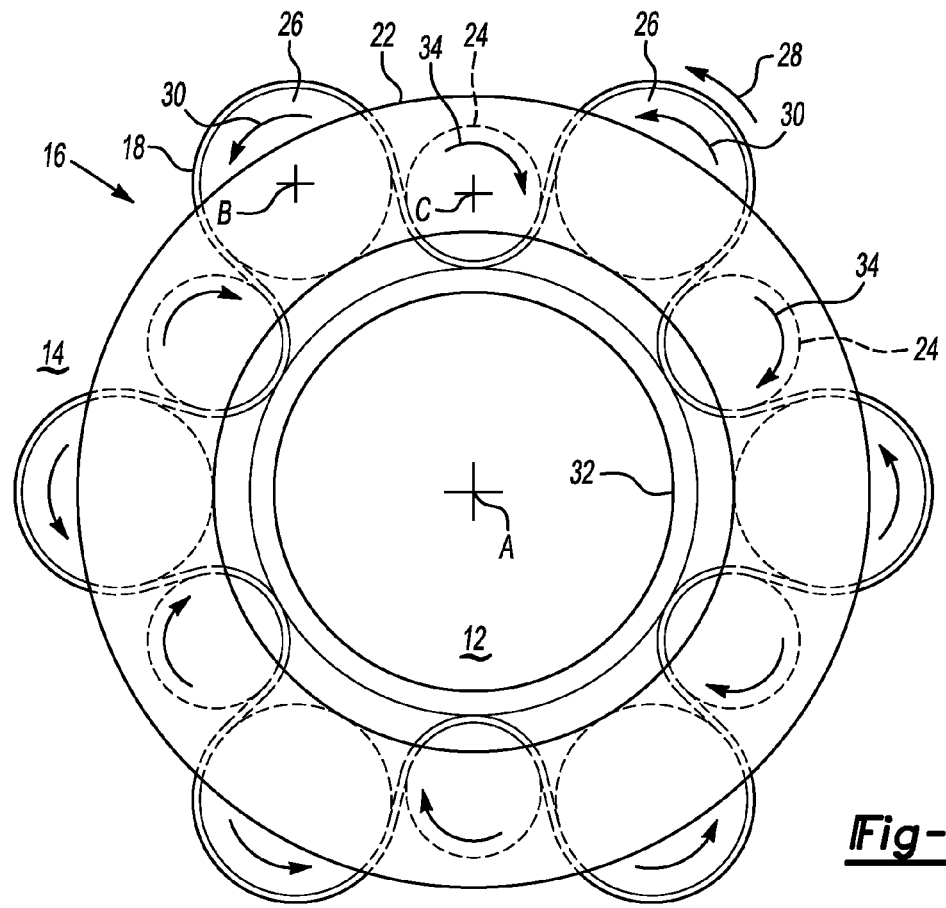
FIG. 3 is a schematic end view of the first embodiment of the energy harvesting system of FIGS. 1 and 2.

Referring to FIGS. 2 and 3, the component 20 (shown in FIG. 1) is driven by the heat engine 16. That is, mechanical energy resulting from the conversion of thermal energy by the shape memory alloy 18 may drive the component 20. In particular, the aforementioned dimensional contraction and the dimensional expansion of the shape memory alloy 18 coupled with the changes in modulus may drive the component 20.

The heat engine 16 may include a support 22. A plurality of inner pulleys 24 and a plurality of outer pulleys 26 are rotationally supported by the support 22. The outer pulleys 26 are and the inner pulleys 22 are driven to rotate by a plurality of continuous loops of shape memory alloy 18. The support 22, inner pulleys 24, and outer pulleys 26 are generally concentrically arranged about a pipe or conduit 32 which generally is located within the first region 12. Fluid may flow through the conduit 32, as indicated by arrow F. The first region 12 may surround the conduit 32 such that the shape memory alloy 18 is in thermal contact or heat exchange relationship with the first region 12. Alternatively, the first region 12 may be the conduit 32 and the shape memory alloy 18 may physically contact with the conduit 32 to provide the desired heat exchange relationship with the first region 12.

Fluid within the energy harvesting system 42 (shown in FIG. 1) forming the first region 12 and/or the second region 14 may be selected from a group of gases, liquids, and combinations thereof. The fluid in the first region 12 may be exhaust, for example, and the conduit 32 may be an exhaust pipe for the vehicle 10. On the other hand, the conduit 32 may be a radiator hose and fluid in the first region 12 would be radiator fluid. The fluid in the second region 14 would therefore be air surrounding the exhaust pipe or radiator hose. The heat engine 16 is arranged about the exhaust pipe or radiator hose to take advantage of the temperature differential between the interior of the exhaust pipe or radiator hose and the exterior environment.

As localized regions of the shape memory alloy 18 are exposed to thermal contact or heat exchange relation with the first region 12 and the second region 14, the shape memory alloy 18 dimensionally expands and contracts. Additionally, the modulus of the shape memory alloy 18 at the localized regions changes as the localized regions of the shape memory alloy 18 are exposed to thermal contact or heat exchange relation with the first region 12 and the second region 14. In response to the dimensionally expanding and contracting shape memory alloy 18 and the accompanying changes in modulus, the shape memory alloy 18 rotates or "walks" in a first rotational direction, indicated by arrow 28, about a first axis A.

In further detail, the inner pulleys 24 and the outer pulleys 26 are arranged in an alternating pattern. The shape memory alloy 18 forms a plurality of continuous loops that wrap around a radial interior of the inner pulleys 24 and a radial exterior of the outer pulleys 26. The radial interior and radial exterior directions are in reference relative to the radial relationship with respect to the first axis A.

The temperature differential between the first region 12 and the second region 14 causes localized regions of the shape memory alloy 18 to sufficiently dimensionally contract or expand in order to rotate the outer pulleys 26 in a second rotational direction 30 and the inner pulleys 24 in a third rotational direction 34. The third rotational direction 34 is opposing to the first rotational direction 28 and the second rotational direction 30. The outer pulleys 26 rotate about the second axes B and the inner pulleys 24 rotate about third axes C both which are parallel to the first axis. The sufficient dimensional contraction or expansion of the shape memory alloy 18 causes the continuous loop of the shape memory alloy 18 to rotate or "walk" around the conduit 32. One or more of the plurality of inner pulleys 24 and/or the plurality of outer pulleys 26 may be connected to the component 20 (shown in FIG. 1) such that the rotation of the plurality of inner pulleys 24 and/or the plurality of outer pulleys 26 provides a rotational output that may drive the component 20. The multiple loops of the shape memory alloy 18 each have sufficient dimensional contraction and expansion at multiple locations about their circumference, which creates a cumulative driving torque on the inner pulleys 24 and the outer pulleys 26.

Speed of rotation of the plurality of inner pulleys 24 and/or the plurality of outer pulleys 26 relative to the component 20 may optionally be modified by one or more gear sets (not shown). Additionally, the temperature differential between the first region 12 and the second region 14 will increase with distance from the conduit 32. Therefore, the distance between the second axes B and the third axes C may be increased or decreased as required to allow the shape memory alloy 18 more or less distance between the inner portion of the inner pulley 24 and the outer portion of the outer pulleys 26. Thus, increasing or decreasing the temperature differential experienced by the shape memory alloy 18 and the overall speed of movement of the heat engine 16. One skilled in the art would be able to determine the optimal distance between the second axes B and the third axes C for a given shape memory alloy 18 and energy harvesting device 42. The shape memory alloy 18 may contract or expand in localized regions. These localized regions may be located between the inner pulleys 24 and the outer pulley 26, or may be the inner portion of the inner pulley 24 and the outer portion of the outer pulleys 26.

Further, the component 20 may include a drive shaft 38 (shown in FIG. 1) attached to the inner pulleys 24 and/or outer pulleys 26. As the shape memory alloy 18 drives the inner pulleys 24 and/or outer pulleys 26 to rotate about the axes B and C of the heat engine 16, the support rotates the drive shaft 38 and drives the component 20.

Figure 4:
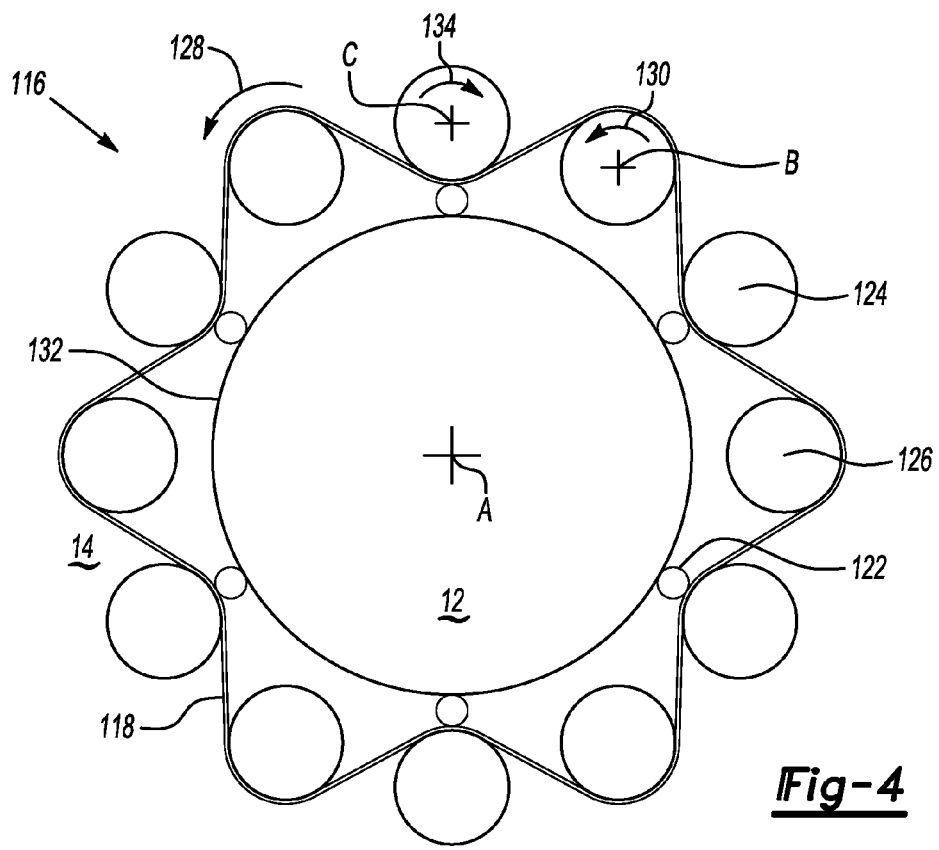
FIG. 4 is a schematic end view of a second embodiment of the energy harvesting system of FIG. 1.

FIG. 4 illustrates a second embodiment of a heat engine 116 for use with a heat exchange system 142 (shown in FIG. 1) for a vehicle 10. The heat engine 116 has a similar arrangement to the heat engine 116 described above. A plurality of outer pulleys 126 and a plurality of inner pulleys 124 are generally concentrically arranged about a conduit 132 and driven to rotate by a plurality of parallel continuous loops of shape memory alloy 118. The first region 12 may surround the conduit 132 such that the shape memory alloy 118 is in thermal contact or heat exchange relationship with the first region 12. Alternatively, the first region 12 may be the conduit 132 and the shape memory alloy 118 may physically contact with the conduit 132 to provide the desired heat exchange relationship with the first region 12.

Fluid within the energy harvesting system 142 (shown in FIG. 1) forming the first region 12 and/or the second region 14 may be selected from a group of gases, liquids, and combinations thereof. The fluid in the first region 12 may be exhaust, for example, and the conduit 132 may be an exhaust pipe for the vehicle 10. On the other hand, the conduit 132 may be a radiator hose and fluid in the first region 12 would be radiator fluid. The fluid in the second region 14 would therefore be air surrounding the exhaust pipe or radiator hose. The heat engine 116 is arranged about the exhaust pipe or radiator hose to take advantage of the temperature differential between the interior of the exhaust pipe or radiator hose and the exterior environment.

As localized regions of the shape memory alloy 118 are exposed to thermal contact or heat exchange relation with the first region 12 and the second region 14, the localized regions of the shape memory alloy 118 dimensionally expand and contract. Additionally, the modulus of the shape memory alloy 118 changes as the localized regions of the shape memory alloy 118 move between thermal contact or heat exchange relation with the first region 12 and the second region 14. In response to the dimensionally expanding and contracting shape memory alloy 118 and the accompanying changes in modulus, the shape memory alloy 118 is driven to rotate or "walk" about a first axis A, indicated by arrow 128.

In further detail, the inner pulleys 124 and the outer pulleys 126 are arranged in an alternating pattern. The shape memory alloy 118 forms a continuous loop that wraps or is threaded around a radial interior of the inner pulleys 124 and a radial exterior of the outer pulleys 126. The radial interior and radial exterior directions are in reference relative to the radial relationship with respect to the first axis A.

The temperature differential between the first region 12 and the second region 14 causes the localized regions of the shape memory alloy 118 to sufficiently dimensionally contract or expand in order to rotate the outer pulleys 126 in a second rotational direction 130 and the inner pulleys 124 in a third rotational direction 134. The third rotational direction 134 is opposing to the first rotational direction 128 and the second rotational direction 130. The outer pulleys 126 rotate about second axes B and the inner pulleys 124 rotate about third axes C both which are parallel to the first axis. The sufficient dimensional contraction or expansion the shape memory alloy 118 causes the shape memory alloy to rotate around the conduit 132 and through the inner pulleys 124 and outer pulleys 126. The inner pulleys 124 and/or outer pulleys 126 may be connected to the component 20 (shown in FIG. 1) such that the rotation of the inner pulleys 124 and/or outer pulleys 126 relative to the conduit 132 may drive the component 20.

A plurality of supports 122 are located between the conduit 132 and the inner pulleys 124 and shape memory alloy 118. The supports 122 provide support for inner pulleys 124 and/or outer pulleys 126 and assist in guiding the multiple continuous loops of the shape memory alloy 118 as they rotate about the conduit 132. Additionally, the supports 122 can be used to adjust the heat exchange relationship between the shape memory alloy 118 and the first region 12. That is, the supports 122 may be used to provide physical distance between the shape memory alloy 118 and the first region 12 to reduce the heat exchange relation between the shape memory alloy 118, the first region 12 and the second region 14 to slow down the heat engine 116, or to maintain an ideal temperature differential in the heat exchange relationship of the shape memory alloy 118, the first region 12 and the second region 14. The multiple loops of the shape memory alloy 118 each have sufficient dimensional contraction and expansion at multiple locations about their circumference, which creates a cumulative driving torque on the inner pulleys 124 and the outer pulleys 126. The shape memory alloy 18 may contract or expand in localized regions. These localized regions may be located between the inner pulleys 24 and the outer pulleys 26, or may be the inner portion of the inner pulleys 24 and the outer portion of the outer pulleys 26.

Figure 5:
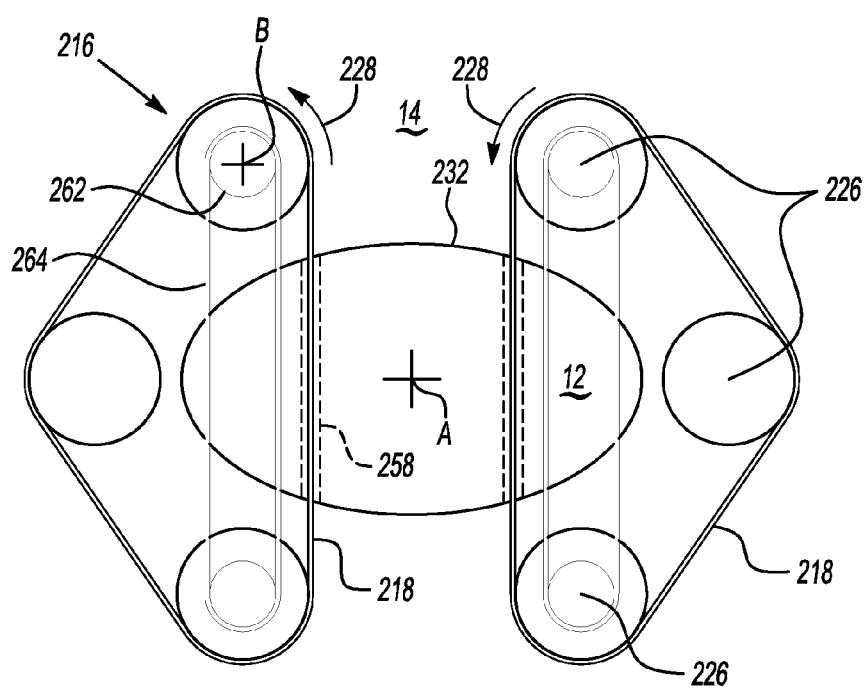
FIG. 5 is a schematic end view of the third embodiment of the energy harvesting system of FIG. 1.

FIG. 5 illustrates a third embodiment of a heat engine 216 for use with a heat exchange system 242 for a vehicle 10 (shown in FIG. 1). A plurality of pulleys 226 are generally arranged about a conduit 232 and driven to rotate by a plurality of generally parallel continuous loops of shape memory alloy 218. The pipe or conduit 232 forms the first region 12 or is generally located within the first region 12. Fluid may flow through the conduit 232. The shape memory alloy 218 is in thermal contact or heat exchange relationship with the first region 12. The shape memory alloy 218 may be arranged to pass through a plurality of passages 258 in the conduit 232. Alternatively the shape memory alloy 218 may be located proximate to the conduit 232 and in thermal contact and heat exchange relation with the first region 12 and the second region 14.

As localized regions of the shape memory alloy 218 are exposed to thermal contact or heat exchange relation with the first region 12 and the second region 14, the shape memory alloy 218 dimensionally expands and contracts. Additionally, the modulus of the shape memory alloy 218 changes as the localized regions of the shape memory alloy 218 are exposed to thermal contact or heat exchange relation with the first region 12 and the second region 14. In response to the dimensionally expanding and contracting shape memory alloy 218 and the accompanying changes in modulus, the pulleys 226 are driven to rotate about their respective axes B. For each set, the pulleys 226 may be connected by an auxiliary belt 264 or other element such as a geartrain, a chain, etc. to synchronize the rotation of the pulleys 226 with one another and created a bias between localized regions of the shape memory alloy 218, specifically between the regions entering and exiting the first region 12 or the second region 14. In the embodiment shown, the auxiliary belt 264 rotates about auxiliary pulleys 262 that rotate about the same axes B as the pulleys 226. Other elements that create a bias between the regions entering and exiting the first region 12 or the second region 14 may be used to ensure the shape memory alloy 218 is rotating in the desired direction.

In further detail, shape memory alloy 218 forms a continuous loop that wraps around a radial exterior of the outer pulleys 226. In the embodiment shown, a passage 258 is defined by the conduit 232 to allow a portion of the continuous loop of the shape memory alloy 218 to pass through the conduit 232. Thus, at least two continuous loops of the shape memory alloy 218 wrap around the outer pulleys 226. The two continuous loops of the shape memory alloy 218 may rotate or "walk" around at least a portion of the conduit 232. The continuous loops of the shape memory alloy 218 may rotate in the same first rotational direction 228, as shown, or in opposing rotational directions.

The passage 258 may increase the heat exchange relationship between the shape memory alloy 218 and the first region 12. The temperature differential between the first region 12 and the second region 14 causes the localized regions of the shape memory alloy 218 to sufficiently dimensionally contract or expand in order to rotate the pulleys 226. Any or all of the pulleys 226 may be connected to the component 20 (shown in FIG. 1) such that the rotation of the pulleys 226 may drive the component 20. In the embodiment shown, at least one pulley 226 driven by each of the continuous loops of the shape memory alloy 218 is connected to the component 20. The shape memory alloy 218 may contract or expand in the localized regions. These localized regions may be located between the pulleys 226, or the conduit 232.

Speed of rotation of the pulleys 226 relative to the component 20 may optionally be modified by one or more gear sets (not shown). Moreover, the component 20 may include a drive shaft 38 (shown in FIG. 1) attached to the pulleys 226.

Figure 6:
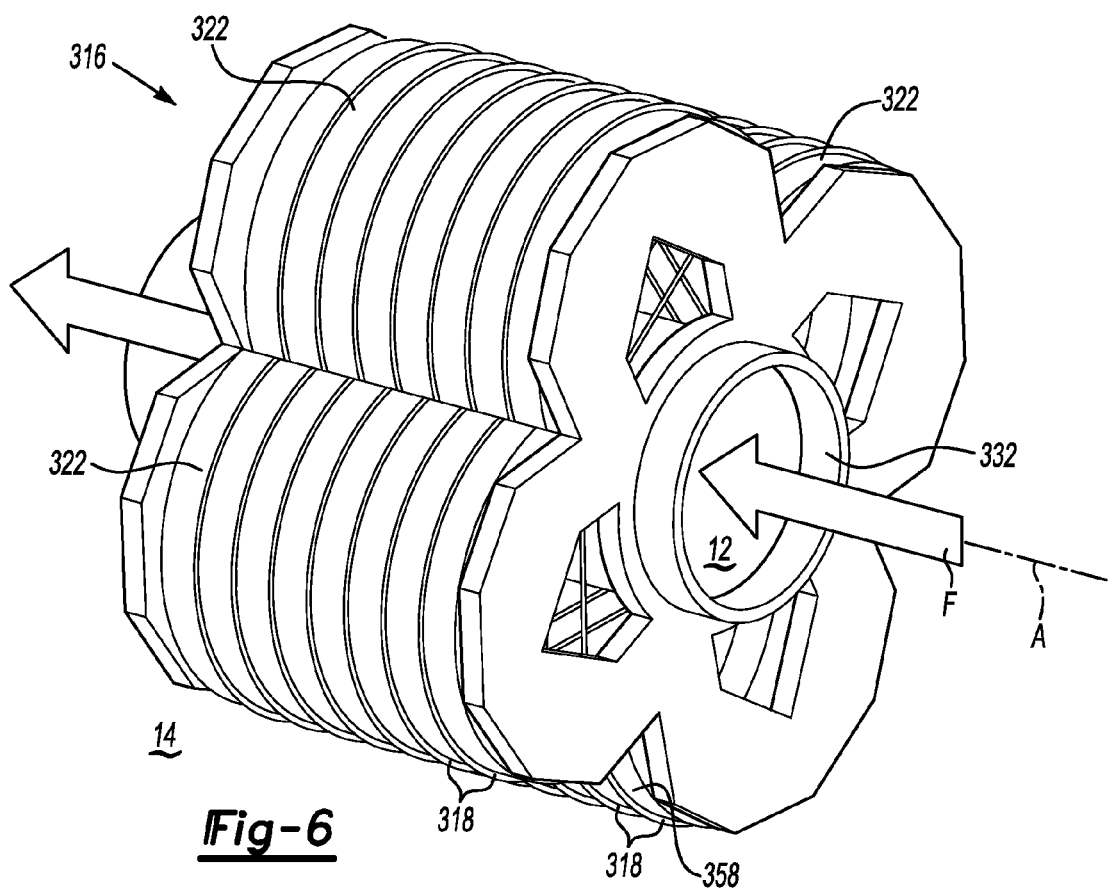
FIG. 6 is a schematic perspective view of a fourth embodiment of the energy harvesting system of FIG. 1.
Figure 7:
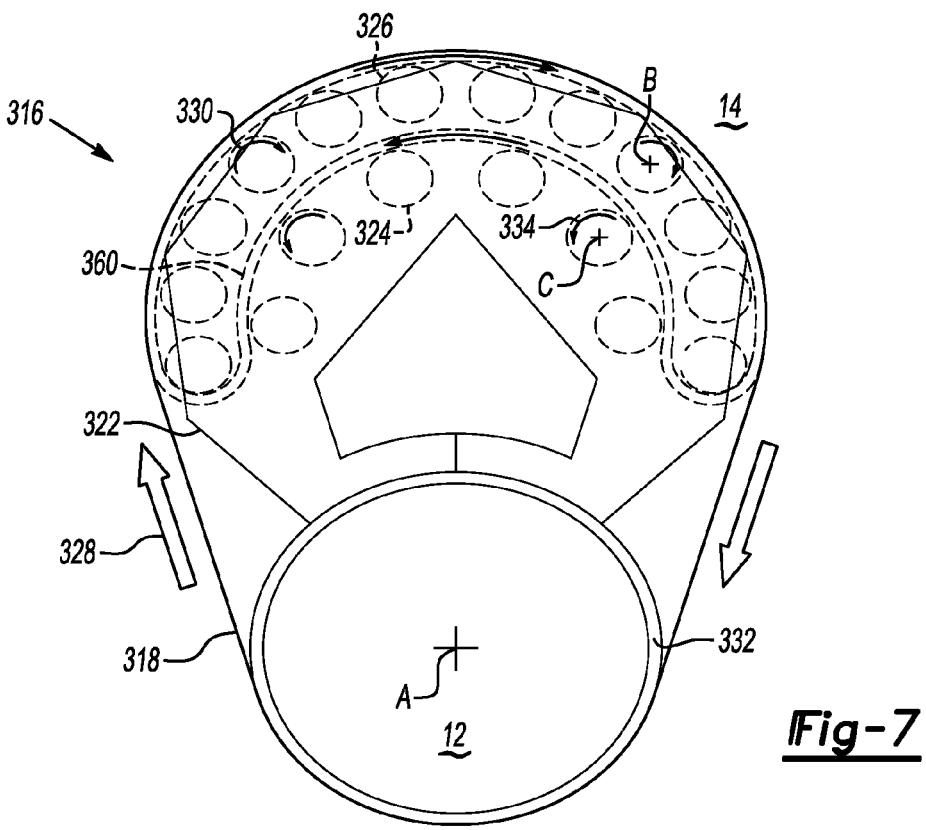
FIG. 7 is a schematic end view of the fourth embodiment of the energy harvesting system of FIGS. 1 and 6.

FIGS. 6 and 7 illustrate a fourth embodiment of a heat engine 316 for use with a heat exchange system 342 for a vehicle 10 (shown in FIG. 1). The heat engine 316 may include an eccentrically shaped support 322. A plurality of inner pulleys 324 and a plurality of outer pulleys 326 are rotationally supported by the support 322 and driven to rotate by a plurality of parallel continuous loops of shape memory alloy 318. The inner pulleys 324, and outer pulleys 326 are generally eccentrically arranged with the support 322. Multiple supports 322 may be arranged in the eccentrically in the shape of lobes 358. Each lobe 358 may be arranged about the circumference of a conduit 332 to surround the conduit 332 and operate together. Each lobe 358 may operate in the same manner and may be connected to drive the same component 20.

The support 322, inner pulleys 324, and outer pulleys 326 are generally eccentrically arranged about the pipe or conduit 332 which forms the first region 12 or is generally located within the first region 12. Fluid may flow through the conduit 332, as indicated by arrow F. The shape memory alloy 318 is in thermal contact or heat exchange relationship with the first region 12. As localized regions of the shape memory alloy 318 are exposed to thermal contact, or heat exchange relation, with the first region 12 and the second region 14, the shape memory alloy 318 dimensionally expands and contracts. Additionally, the modulus of the shape memory alloy 318 changes as the localized regions of the shape memory alloy 318 are exposed to thermal contact, or heat exchange relation, with the first region 12 and the second region 14. In response to the dimensionally expanding and contracting shape memory alloy 318 and the accompanying changes in modulus, the shape memory alloy 318 is driven to rotate about a first axis A in a first rotational direction 328.

In further detail, the outer pulleys 326 are surrounded by a drive belt 360. The shape memory alloy 318 forms a continuous loop that wraps around the conduit 332, a radial exterior of the outer pulleys 326 and of the drive belt 360. The radial interior and radial exterior directions are in reference relative to the radial relationship with respect to the first axis A.

The temperature differential between the first region 12 and the second region 14 causes localized regions of the shape memory alloy 318 to sufficiently dimensionally contract or expand in order to rotate the drive belt 360 around the outer pulleys 326. The shape memory alloy 318 rotates about the conduit 332 and rotation of the drive belt 360 rotates the outer pulleys 326. The drive belt 360 and the outer pulleys 326 rotate in a second rotational direction 330. The drive belt 360 then rotates the inner pulleys 324 in a third rotational direction 334. The third rotational direction 334 is opposing to the first rotational direction 328 and the second rotational direction 330. The outer pulleys 326 rotate about second axes B and the inner pulleys 324 rotate about third axes C, both of which are parallel to the first axis A. The sufficient dimensional contraction or expansion of the shape memory alloy 318 causes the shape memory alloy 318 to rotate or "walk" around the conduit 332. One or more of the inner pulleys 324 and/or outer pulleys 326 may be connected to the component 20 (shown in FIG. 1) such that the rotation of the inner pulleys 324 and/or outer pulleys 326 relative to the conduit 332 may drive the component 20. The multiple continuous loops of the shape memory alloy 318 are arranged in parallel loops along each support 322. However, when there is more than one support 322 surrounding the conduit 332, the axial location of shape memory alloy 318 is staggered for each support 322 to prevent interference of the loops of shape memory alloy 318 between adjacent supports 322.

Speed of rotation of the inner pulleys 324 and/or outer pulleys 326 relative to the component 20 may optionally be modified by one or more gear sets (not shown). Moreover, the component 20 may include a drive shaft 38 (shown in FIG. 1) attached to the inner pulleys 324 and/or outer pulleys 326.

Figure 8:
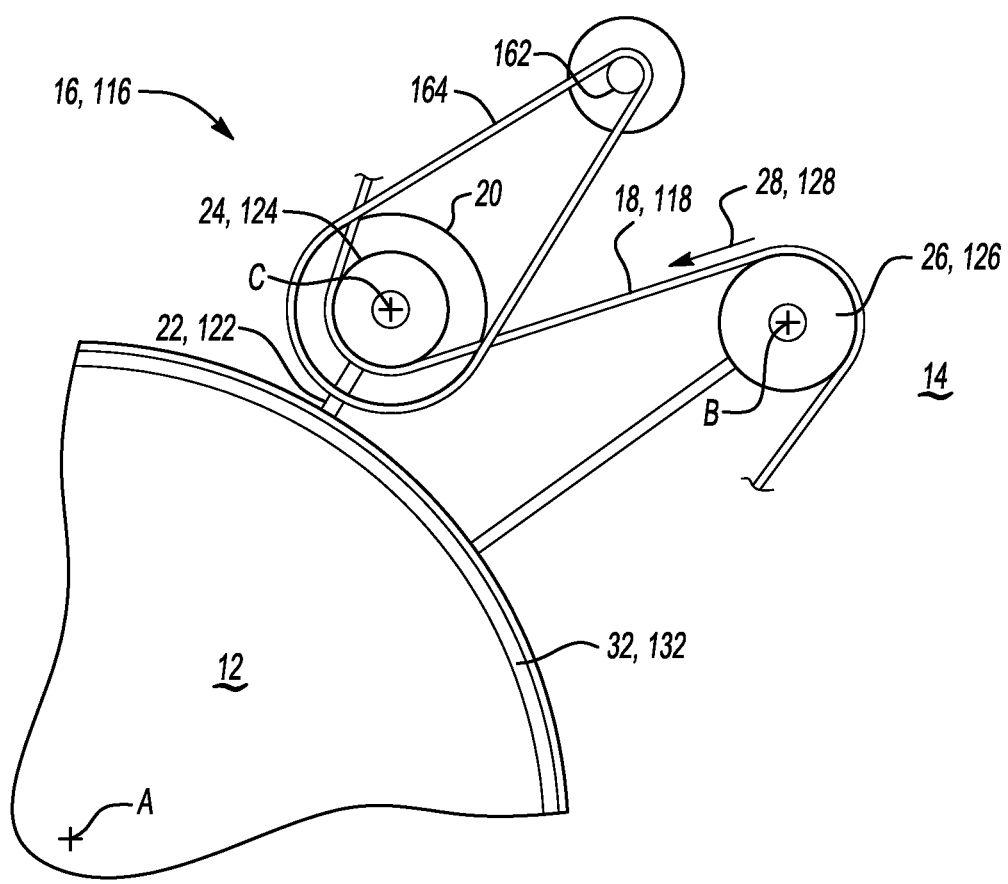
FIG. 8 is a schematic perspective view of a motor/generator for use with the first and second embodiments of the energy harvesting system of FIGS. 1-4.

FIG. 8 is a partial side view of a motor/generator 20 for use with the first and second embodiments of the energy harvesting system 42, 142 of FIGS. 1-4. A partial view of a conduit 32, 132 and a heat engine 16, 116 are shown. The heat engine 16, 116 surrounds the conduit 32, 132 and operates in a manner as described and shown above. The shape memory alloy 18, 118 rotates or "walks" around the first axis A. The plurality of outer pulleys 26, 126 (only one shown) rotate about second axes B and the plurality of inner pulleys 24, 124 (only one shown) rotate about third axes C. Additionally, the motor/generator 20 is connected to at least one of the inner pulleys, 24, 124. As localized regions of the shape memory alloy 18, 118 are exposed to the first region 12 and the second region 14 the inner pulleys 24, 124 and the outer pulley 26, 126 are driven to rotate. The rotation of the inner pulley 24, 124 drives the motor/generator 20 that is connected thereto. An auxiliary pulley 162 and auxiliary belt 164 are connected to the motor/generator 20. The auxiliary belt 164 transfers the output from the motor/generator 20. Additional motor/generators 20 may be connected to and driven by the other inner pulleys 24, 124 of the heat engine 16, 116. One skilled in the art would be able to determine the number of motor/generators 20 to connect to the heat engine 16, 116 for a particular energy harvesting device 42 and heat source.

Additionally, although the motor/generator 20 is illustrated as being driven by the at least one inner pulley 24, 124 the motor/generator 20 may alternatively be driven by at least one outer pulley 26, 126. Further, multiple motor/generators 20 may be driven by multiple of the inner pulleys 24, 124 and/or outer pulleys 26, 126. The output of each of the motor/generators 20 may be transferred to the auxiliary pulleys 62 and/or may be combined with one another to provide power to various vehicle 10 accessories. Further, although FIG. 8 illustrates the motor/generator with the inner pulleys 24, 124 of the first and second embodiments the motor/generator 20 may be connected to any pulleys 226, 324, 326 of the heat engines 216, 316 in a similar manner.

While the best modes for carrying out the invention have been described in detail, those familiar with the art to which this invention relates will recognize various alternative designs and embodiments for practicing the invention within the scope of the appended claims.

The invention claimed is:

1. An energy harvesting system comprising:
a first region having a first temperature;
a second region having a second temperature that is different from the first temperature;
a conduit located at least partially within the first region;
a heat engine configured for converting thermal energy to mechanical energy including a shape memory alloy forming at least one generally continuous loop, wherein the shape memory alloy is disposed in heat exchange contact with each of the first region and the second region; and
wherein the shape memory alloy is driven to rotate at least partially around the conduit in response to the temperature difference between the first region and the second region; and
at least one pulley driven by the rotation of the shape memory alloy, wherein the at least one pulley is operatively connected to a component to thereby drive the component, wherein the at least one pulley is one of a plurality of pulleys, and wherein a support is secured to the conduit to rotatably support the plurality of pulleys for the heat engine,
wherein the at least one support further comprises a plurality lobes, wherein each of the plurality of lobes partially surrounds the conduit, such that the plurality of lobes together surrounds the conduit and each rotatably support the plurality of pulleys.

2. The energy harvesting system of claim 1, wherein the heat engine further comprises a plurality of inner pulleys and a plurality of outer pulleys rotatably mounted to each of the plurality of lobes, and wherein the at least one continuous loop of the shape memory alloy is threaded around the conduit and the plurality of outer pulleys for a respective one of the plurality of lobes to rotate the plurality of outer pulleys and the plurality of inner pulleys such that the shape memory alloy is driven to rotate around the conduit.

3. The energy harvesting system of claim 2, wherein the shape memory alloy further comprises a plurality of continuous loops each threaded around one of the respective lobes.

4. The energy harvesting system of claim 3, wherein each of the respective lobes has a plurality of continuous loops of the shape memory alloy threaded thereabout.

5. The energy harvesting system of claim 1, wherein the conduit defines a passage and a portion of the continuous loop of the shape memory alloy extends through the passage.

6. The energy harvesting system of claim 1, wherein the component is a motor/generator operatively connected to the at least one pulley.

7. A method of harvesting energy comprising:
exposing localized regions of a shape memory alloy to heat exchange contact with a first region having a first temperature and a second region having a second temperature that is different from the first temperature, wherein the shape memory alloy has a crystallographic phase changeable between austenite and martensite in response to the temperature difference between the first region and the second region;
expanding and contracting the localized regions of the shape memory alloy in response to the temperature difference between the first region and the second region;
rotating at least one continuous loop of the shape memory alloy at least partially around a conduit located within the first region in response to expanding and contracting the localized regions of the shape memory alloy;
rotating at least one pulley with the rotation of the shape memory alloy, and
driving a component with the rotation of the at least one pulley;
wherein exposing the localized regions of the shape memory alloy to heat exchange contact with the first region and the second region further comprises threading the at least one continuous loop of the shape memory alloy alternately through an interior of a plurality of inner pulleys and an exterior of a plurality of outer pulleys, wherein the plurality of inner pulleys and plurality of outer pulleys are rotatably mounted to a support in an alternating relationship to one another such that the plurality of inner pulleys are at least partially located in one of the first region and the second region, and the plurality of outer pulleys are at least partially located in the other of the first region and the second region,
wherein exposing the localized regions of the shape memory alloy to heat exchange contact with the first region and the second region further comprises rotating the at least one continuous loop of the shape memory alloy around the conduit, the plurality of inner pulleys, and the plurality of outer pulleys rotatably mounted to a respective one of a plurality of lobes.

8. A vehicle comprising:
a conduit for the vehicle;
a first region having a first temperature, wherein the first region surrounds the conduit;
a second region having a second temperature that is different from the first temperature, wherein the second region at least partially surrounds the first region;
a heat engine configured for converting thermal energy to mechanical energy including:
a support concentrically located about the conduit;
a plurality of inner pulleys rotatably mounted to the support;
a plurality of outer pulleys rotatably mounted to the support in an alternating relationship with the inner pulleys;
at least one continuous loop of a shape memory alloy alternately threaded about an interior of the plurality of inner pulleys and an exterior of the outer pulleys surrounding the conduit; and
wherein the shape memory alloy is disposed in heat exchange contact with each of the first region and the second region such that at least one of the plurality of inner pulleys and the plurality of outer pulleys is driven to rotate by the shape memory alloy in response to the temperature difference between the first region and the second region; and
a component of the vehicle driven by the rotation of the at least one of the plurality of inner pulleys and the plurality of outer pulleys.

9. The vehicle of claim 8, wherein the conduit is an exhaust pipe for the vehicle.

10. The vehicle of claim 8, wherein a portion of the shape memory alloy is in contact with the exhaust pipe and the interior of each of the plurality of inner pulleys to support the heat engine about the conduit.

11. The vehicle of claim 8, wherein the at least one continuous loop of the shape memory alloy expands and contracts at localized regions between the plurality of inner pulleys and the plurality of outer pulleys in response to the temperature difference between the first region and the second region such that at least one of the plurality of inner pulleys and the plurality of outer pulleys is driven to rotate by the shape memory alloy.

12. The vehicle of claim 8, wherein the at least one continuous loop of the shape memory alloy further comprises a plurality of continuous loops each threaded in the same alternating relationship between the plurality of inner pulleys and the plurality of outer pulleys.

13. The vehicle of claim 8, wherein the plurality of inner pulleys are at least partially located within the first region and the plurality of outer pulleys are at least partially located within the second region.

14. The vehicle of claim 8, wherein the component is a motor/generator operatively connected to the at least one pulley.

* * * * *